(12) United States Patent
Tomizawa

(10) Patent No.: US 9,124,749 B2
(45) Date of Patent: Sep. 1, 2015

(54) IMAGE FORMING APPARATUS AND EXECUTION METHOD THEREOF

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hajime Tomizawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/019,771

(22) Filed: Sep. 6, 2013

(65) Prior Publication Data
US 2015/0070720 A1 Mar. 12, 2015

(51) Int. Cl.
*G06F 21/00* (2013.01)
*G06K 15/00* (2006.01)
*H04N 1/00* (2006.01)
*H04N 1/32* (2006.01)
*G06F 3/12* (2006.01)

(52) U.S. Cl.
CPC ......... *H04N 1/00925* (2013.01); *H04N 1/0022* (2013.01); *H04N 1/00408* (2013.01); *H04N 1/32101* (2013.01)

(58) Field of Classification Search
CPC . H04L 63/08; H04L 63/0815; H04L 63/0823; H04L 63/083; H04L 63/0846; H04L 63/067; H04L 63/068; H04L 9/3271; H04N 1/00838; H04N 1/00875; H04N 1/4406; H04N 1/4413; G06F 21/608; G06F 3/1238; G06F 3/129

USPC ................ 358/1.11–1.18, 400–404; 713/156, 713/182–185; 726/1–10, 21, 26–33
See application file for complete search history.

(56) References Cited

U.S. PATENT DOCUMENTS

| | | | |
|---|---|---|---|
| 2004/0184064 A1* | 9/2004 | TaKeda et al. | 358/1.13 |
| 2006/0101279 A1* | 5/2006 | Akita | 713/184 |
| 2009/0207434 A1* | 8/2009 | Tanaka | 358/1.14 |
| 2010/0115268 A1* | 5/2010 | Kudo | 713/156 |

FOREIGN PATENT DOCUMENTS

| | | | |
|---|---|---|---|
| JP | 2007-116266 | | 5/2007 |
| JP | 2007116266 A | * | 5/2007 |
| JP | 2011139380 A | * | 7/2011 |
| JP | 2011198017 A | * | 10/2011 |

* cited by examiner

*Primary Examiner* — Chad Dickerson
(74) *Attorney, Agent, or Firm* — Amin, Turocy & Watson, LLP

(57) ABSTRACT

In accordance with one embodiment, an image forming apparatus comprises an interface, a storage section configured to store identification information, and a control section. The interface is configured to carry out data transmission/reception with an external device. The control section is configured to control the interface, generate the identification information, store the identification information in the storage section, and send the identification information to the external device. In addition, when the identification information which is stored in the storage section exists in information received from the interface, the control section carries out an image forming operation, and does not carry out the image forming operation when the identification information does not exist.

8 Claims, 5 Drawing Sheets

FIG.5

| SCANNING ACCEPTANCE ID | ISSUING DATE AND TIME |
|---|---|
| 1234ABCDEFG | 2013/03/19 09:05:21 |
| 5678HIJKLMN | 2013/03/19 10:16:39 |
| 9012OPQRSTU | 2013/03/19 11:53:42 |

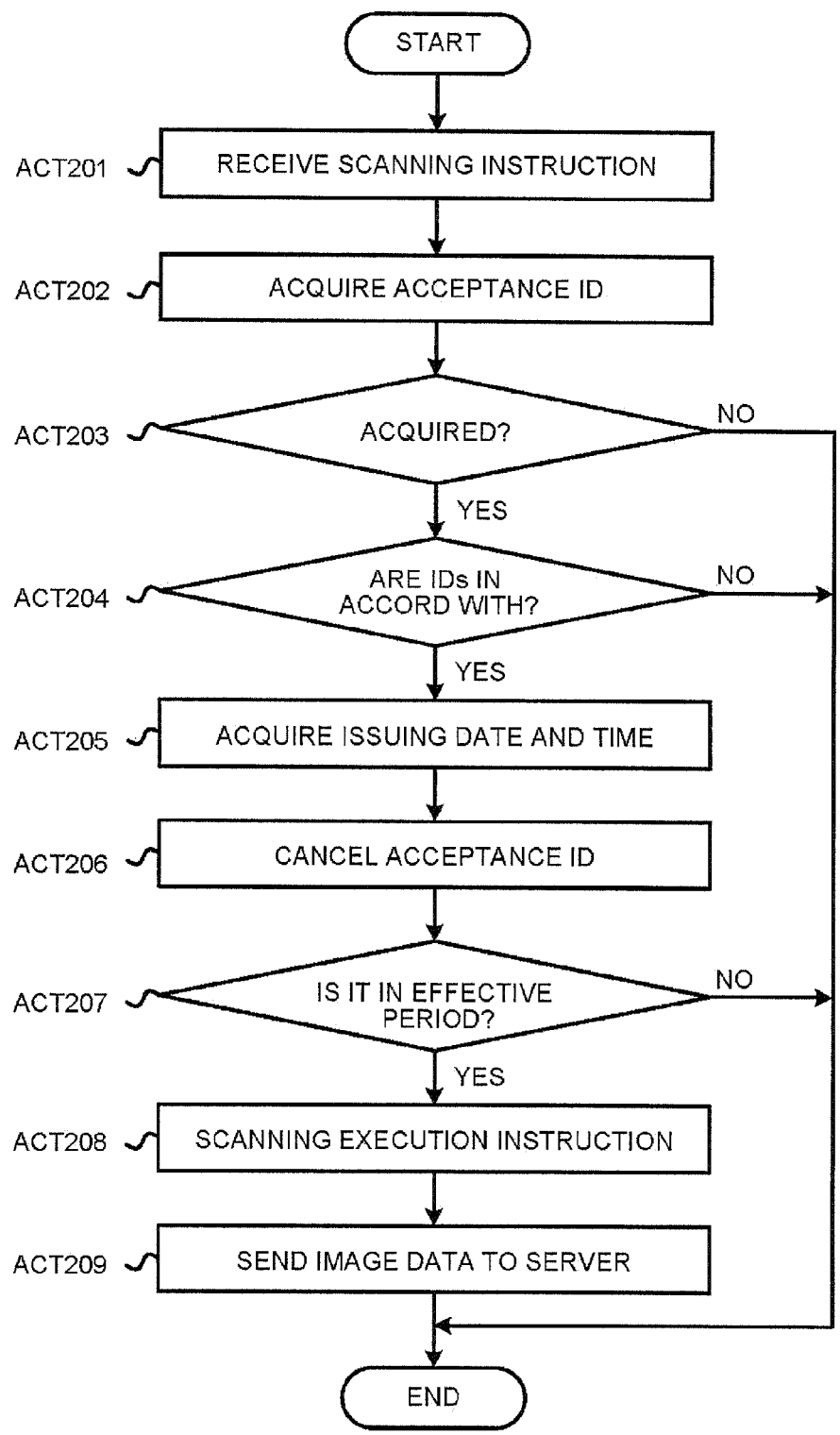

IMAGE FORMING APPARATUS AND EXECUTION METHOD THEREOF

FIELD

Embodiments described herein relate to a technology that a scanner accepts a scanning instruction from an external device to carry out scanning.

BACKGROUND

Conventionally, there is a method for storing a scanned image which is acquired by sending a scanning instruction to a scanner via an external device connected with a network in various image storage positions. In this case, the scanner carries out scanning according to the scanning instruction received from the external device.

However, sometimes the scanner accepting the scanning instruction which is sent by an unintentional device executes the scanning.

BRIEF DESCRIPTION OF THE DRAWINGS

FIG. 5 is a diagram illustrating a data structure example of a storage section stored by the scanner; and FIG. 6 is a flowchart illustrating an operation example until the scanner implements scanning.

DETAILED DESCRIPTION

In accordance with the present embodiment, an image forming apparatus includes an interface and a control section. The interface is configured to carry out data transmission/reception with an external device. The control section is configured to control the interface so as to generate identification information, store the identification information in a storage section, and send the identification information to the external device. In addition, when the identification information which is stored in the storage section exists in information which is received from the interface, the control section carries out an image forming operation, and does not carry out the image forming operation when the identification information does not exist.

In accordance with the embodiment, a scanner has a function of WEB browser concerning displaying an image or a text on a control panel according to the data in a HTML (Hyper Text Markup Language) form which is acquired from a server. Hereinafter, the data in the HTML form will be called as HTML for short.

The scanner in the embodiment executes a script embedded in the HTML and issues a scanning acceptance ID (Identification) when the HTML is displayed on the control panel. The scanning acceptance ID becomes the identification information. When a scanning instruction is accepted from the external device, the scanner carries out scanning only when the issued scanning acceptance ID is contained in the scanning instruction.

In the embodiment, a condition that the scanning is carried out according to the issued scanning acceptance ID is assumed to be for once. In addition, in the embodiment, a preset effective period is used for the issued scanning acceptance ID, and the scanning acceptance ID out of the effective period becomes ineffective.

Hereinafter, the embodiment described herein will be described.

Figure 1:
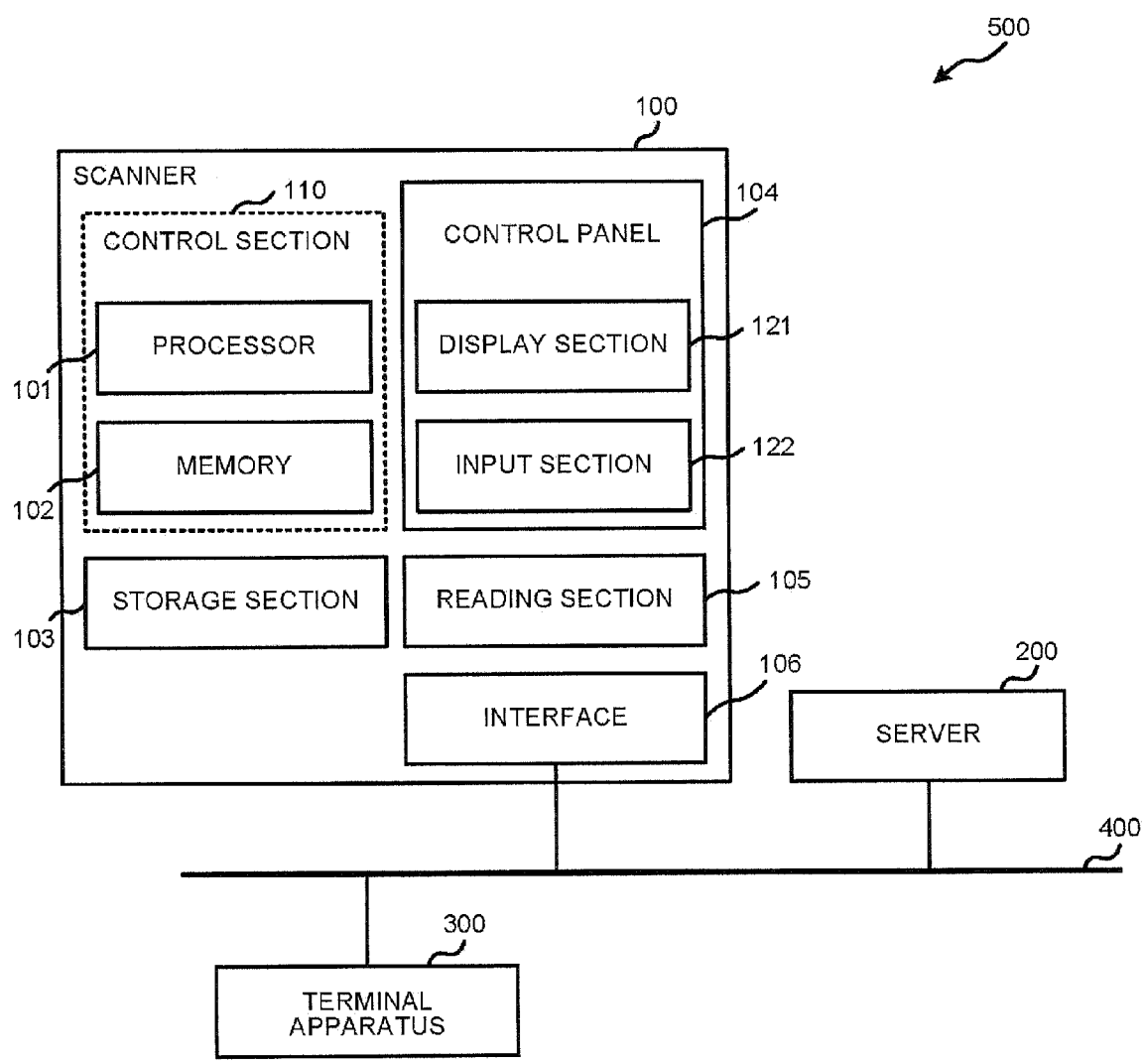
FIG. 1 is a diagram illustrating a structure example of a system according to the present embodiment, and is a diagram illustrating an internal structure example of a scanner.

A system 500 of the present embodiment, as shown in FIG. 1, comprises a scanner 100 serving as an image forming apparatus, a server 200 and a terminal apparatus 300, each of which can carry out communication through a network 400.

The scanner 100 comprises a processor 101, a memory 102, a storage section 103, a control panel 104, a reading section 105 and an interface 106. The processor 101, for example, is a CPU (Central Processing Unit), which controls an operation of an apparatus positioned inside the scanner 100. The memory 102 is a storage apparatus, which comprises a volatile RAM (Random Access Memory) and a non-volatile ROM (Read Only Memory). The memory 102 stores necessary programs or information. Sequentially, the processor 101 carries out a control instruction on each apparatus according to the program codes by executing the programs.

The storage section 103, for example, is an auxiliary storage apparatus such as an HDD (Hard disk drive) or a flash memory and the like, which stores the data in a non-volatile type. The storage section 103 stores the scanning acceptance ID mentioned above or a parameter when the scanning is carried out, and further temporarily stores the scanned image data. The control panel 104 displays an operation screen for accepting a touch operation from a user, and meanwhile, displays a processing state and a processing result. The control panel 104 comprises a display section 121 and an input section 122. The display section 121, for example, is a liquid crystal panel, and the input section 122 which is laminated on the surface of the liquid crystal panel, for example, is a touch panel.

The reading section 105 comprises a transmission glass plate on which original sheet is arranged, a light emitter, an optical system and a CCD sensor or a CMOS sensor and the like. The reading section 105 reads the original sheet which is arranged on the transmission glass plate and converts it into electronic data. The interface 106, for example, is an LAN (Local Area Network) board, which is connected with the network 400 in a wired or wireless manner. Through the structure, the scanner 100 can accept the scanning instruction from the external device (the server 200 or the terminal apparatus 300 in the present example) via the network 400. Upon the scanning instruction is accepted, the processor 101 drives the reading section 105 to carry out the scanning. The image data obtained by the scanning are sent to a device issued the scanning instruction.

A control section 110 comprises the processor 101 and the memory 102. The program which is acquired by the processor 101 inside the control section 110 is developed in the memory 102 inside the control section 110 to be executed. Thereby, the control section 110 controls each piece of hardware inside the scanner 100.

In addition, in the memory 102 or the storage section 103, the HTML is acquired and decoded, and the program which is displayed on the control panel 104 is pre-stored. The control section 110 provides a function of a browser to the user by executing the program.

Figure 2:
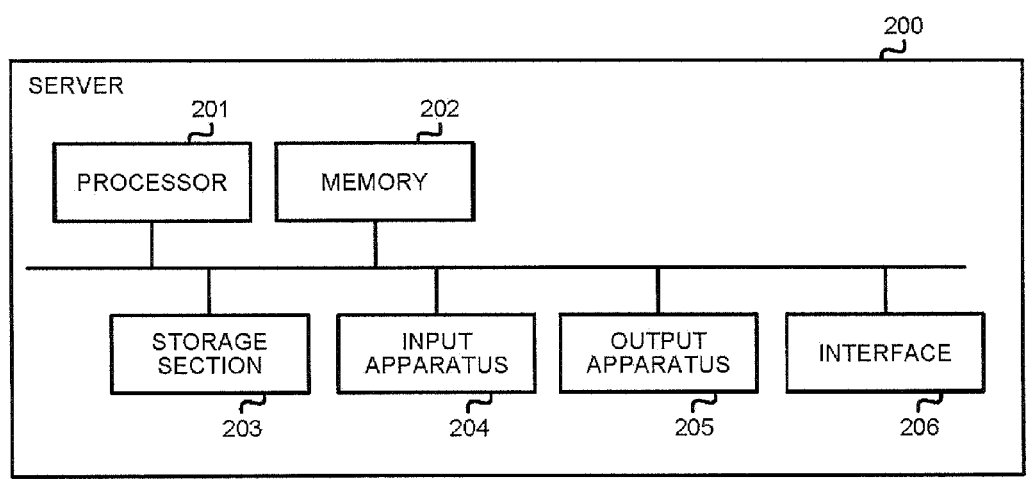
FIG. 2 is a diagram illustrating an internal structure example of a server.

The internal structure of the server 200 is described with reference to FIG. 2. In addition, an internal structure of the terminal apparatus 300 has differences in performance, but it is the same as that of the server 200, and therefore, the description is omitted. The server 200 comprises a processor 201, a memory 202, a storage section 203, an input apparatus 204, an output apparatus 205 and an interface 206. The input apparatus 204, for example, is a keyboard, a mouse and the like, and the output apparatus 205 is a monitor and the like. Other apparatuses have differences in performance, but are the same as those of the scanner 100 mentioned above.

The storage section 203 of the server 200 stores the program issuing the HTML in advance. In addition, the storage section 203 stores the HTML for sending, the image data for displaying or text data in advance. The processor 201 executes the program to issue the HTML together with the image data and the like to the scanner 100. In addition, the program for issuing the scanning instruction to the scanner 100 is further incorporated in the storage section 103 in advance.

Figure 3:
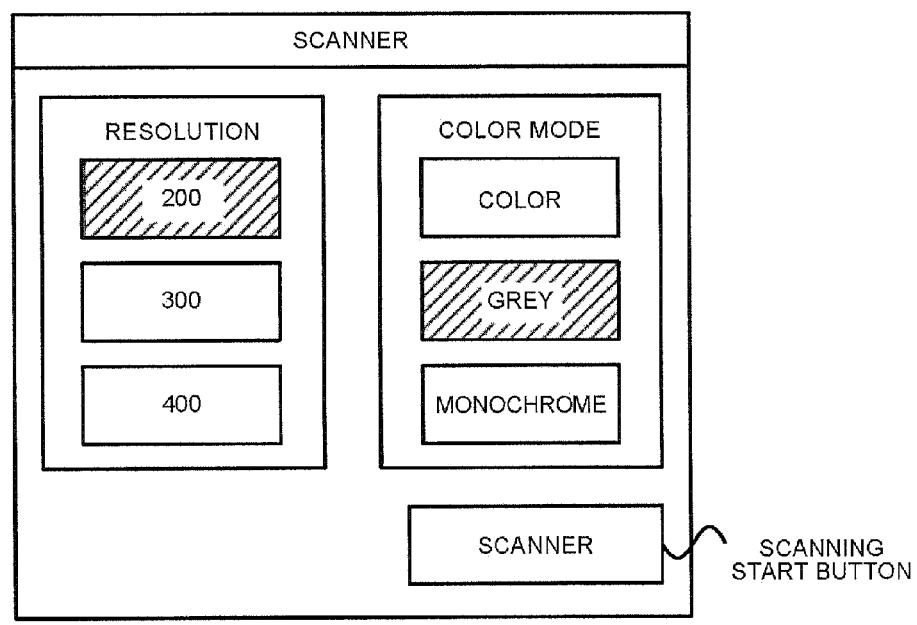
FIG. 3 is a diagram illustrating a display example in the scanner.

According to the structure above, the scanner 100 can acquire the HTML issued by the server 200, and display it on the control panel 104. FIG. 3 shows a screen which is displayed according to the HTML. On the screen, the user can select a resolution and a color mode when the scanning is carried out. The user operating the control panel 104 presses a scanning start button after setting the random resolution and the color mode. Upon the scanning start button is pressed, the HTTP POST is sent to the server 200.

The server 200 issues the scanning instruction to the scanner 100 according to a content subjected to the POST. And then, the scanner 100 accepts the scanning instruction to carry out the scanning, and sends the generated image data to the server 200.

In this way, such an operation that the server 200 provides the screen for carrying out the scanning, the scanner 100 carries out the scanning, and the server 200 acquires the obtained image data can be carried out.

In the present example, the terminal apparatus 300 can further directly send the scanning instruction to the scanner 100. However, if the scanner 100 completely accepts the scanning instruction from external, the scanning may be executed for the scanning instruction from an unintentional device. In the case of the present example, for example, other user using the terminal apparatus 300 maybe executes the scanning of the original sheet of the user operating the scanner 100. Therefore, the scanner 100 of the present embodiment has a function of being capable of distinguishing whether or not the scanning instruction is effective.

For whether or not the scanning instruction is effective, the scanning instruction based on the operation by the user on the control panel 104 is effective. This is because the server 200 accepting the scanning instruction which is sent when the user operates the screen instructs the scanner 100 to carry out the scanning. Conversely, the scanning instruction from the device (the terminal apparatus 300 in the present example) which does not issue the HTML comes from other device, and therefore, it is ineffective.

Therefore, the scanner 100 issues the scanning acceptance ID for allowing the scanning to the device (the server 200 in the present example) which sent the HTML. The server 200 sends the scanning instruction together with the scanning acceptance ID to the scanner 100. When the issued scanning acceptance ID is contained in the received instruction, the scanner 100 determines that the instruction is that comes from the effective device and executes the scanning.

Figure 4:
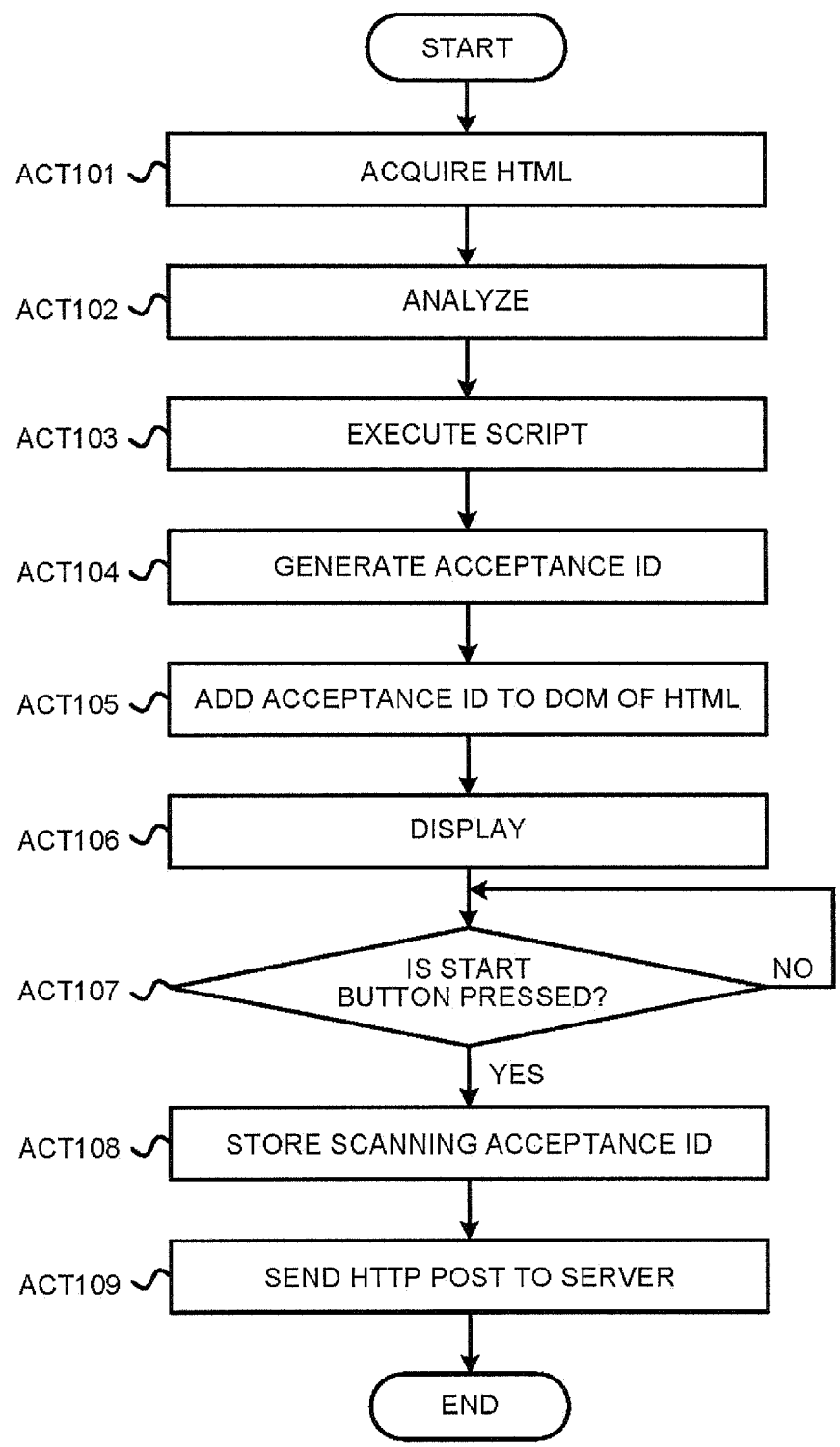
FIG. 4 is a diagram illustrating an operation example when the scanner issues a scanning acceptance ID.

The scanning acceptance ID is a unique character string, which issued and managed by the scanner 100. An operation example when the scanner 100 issues the scanning acceptance ID to the server 200 is described with reference to a flowchart shown in FIG. 4.

First, the control section 110 of the scanner 100 acquires the HTML issued by the server 200 via the HTTP GET (ACT101).

Next, the control section 110 identifies a tag included in the acquired HTML, and analyzes the instruction of the HTML (ACT 102).

The control section 110 executes the script incorporated in the HTML (ACT103). Herein, a special script (hereinafter, called as ID issuing script) for issuing the scanning acceptance ID is included in the HTML acquired from the server 200. Therefore, the execution of the ID issuing script is also carried out at this moment.

Next, the control section 110 executes the ID issuing script to generate a new scanning acceptance ID (ACT104). As the scanning acceptance ID is a unique character string, it is generated as a character string which is not repeated with that issued one.

The ID issuing script becomes a structure of adding the generated scanning acceptance ID to a hidden tag in the HTML issued by the server 200. Thus, the control section 110 operates a DOM of the HTML such that the scanning acceptance ID generated according to the script in ACT104 is added in the suitable hidden tag (ACT105).

Next, the control section 110 enables the control panel 104 to operate, and displays the operation screen on the control panel 104 according to the description of the HTML (ACT106). The screen displayed herein is as shown in FIG. 3. The issued scanning acceptance ID is not displayed because it is added to the hidden tag.

Next, the control section 110 determines whether or not the scanning start button is pressed by the user (ACT107). The control section 110 waits for the user operating the control panel 104 to press the scanning start button (loop of No in ACT107). Next, if determines the scanning start button is pressed (Yes in ACT107), the control section 110 stores the generated scanning acceptance ID (ACT108). In the present example, an example that the control section 110 is assumed to store the scanning acceptance ID in the storage section 103 is described, but the scanning acceptance ID can be further stored in the memory 102. The storage section 103 stores issuing time and date correspondingly according to the instruction from the control section 110. FIG. 5 illustrates one example of the store status. In the example in FIG. 5, the storage section 103 stores three scanning acceptance IDs. In addition, the storage section 103 stores ID with a time and date denoting when it is issued correspondingly. In this way, the acceptance of the scanning is determined according to the pressing of the scanning start button, and the scanning acceptance ID is stored in the storage section 103.

The control section 110 enables the interface 106 to operate to send a form content of the HTML to the server 200 via the HTTP POST (ACT 109). The data sent herein, of course include the resolution or the color mode selected by the user, and further include the scanning acceptance ID registered in the hidden tag.

Thereby, the server 200 can further acquire the scanning acceptance ID issued by the scanner 100 besides the resolution and the color mode selected by the user.

Next, the processing of carrying out the scanning using the acquired scanning acceptance ID is described. As a method for sending the scanning instruction to the scanner 100, in the present embodiment, an SOAP is used to send the scanning instruction to the scanner 100 from the server 200. The sent data include the resolution or the color mode during the scanning, and in addition, further include the acquired scanning acceptance ID. The processing carried out by the scanner 100 at this moment is described with reference to a flowchart shown in FIG. 6.

First, the control section 110 of the scanner 100 receives the scanning instruction sent from the server 200 via the interface 106 (ACT201).

The control section 110 tries to acquire the scanning acceptance ID according to the instruction content (ACT202). As mentioned above, the scanning instruction is notified by the SOAP, and therefore, in the SOAP sent from the server 100, the scanning acceptance ID is included in a determined XML element. The control section 110 determines whether or not the scanning ID can be acquired (ACT203). When the scanning acceptance ID can be acquired (Yes in ACT203), the processing proceeds to ACT204, and when the scanning acceptance ID cannot be acquired (No in ACT203), it is ended.

Next, the control section 110 determines whether or not the acquired scanning acceptance ID accords with the issued scanning acceptance ID which is stored in the storage section 103 and (ACT204). It is carried out by comparing the character strings of the scanning acceptance IDs with each other. When they accord with each other (Yes in ACT204), the processing proceeds to ACT205, and when they do not accord with each other (No in ACT204), the processing is ended.

The control section 110 acquires the issuing time and date of the acquired scanning acceptance ID (ACT205). As shown in FIG. 5, the issued scanning acceptance ID is stored together with the issuing time and date in the storage section 103, and thereby, is acquired by the control section 110.

Next, the control section 110 cancels the scanning acceptance ID acquired in ACT202 from the scanning acceptance ID stored in the storage section 103 (ACT206).

The control section 110 compares the issuing time and date acquired in ACT205 with current time and date to determine whether or not it is out of the effective period of the scanning acceptance ID (ACT207). Herein, the effective period of the scanning acceptance ID is predetermined to be 30 minutes and the like. The user can further set the effective period. In the result of comparing the times and the dates, when it is out of the determined effective period (No in ACT207), the processing is ended. If it is in the effective period (Yes in ACT207), the processing proceeds to ACT208.

Next, the control section 110 can confirm an ID included in the scanning instruction is effective, and therefore, instructs scanning execution to the reading section 105 (ACT208). The reading section 105 accepts the instruction to start the scanning. Thereby, the image data is acquired. Finally, the control section 110 enables the interface 106 to operate to send the acquired image data to the server 200 issued the scanning instruction (ACT209).

Thereby, when the scanning acceptance ID is included in the scanning instruction, the control section 110 instructs the scanning execution. Thereby, the scanner 100 carries out the scanning serving as an image forming processing. On the other hand, when the scanning acceptance ID is not included in the scanning instruction, the control section 110 does not instruct the scanning execution. In addition, when the HTML is not displayed on the control panel 104, the scanning acceptance ID cannot be acquired, and therefore, the scanner 100 does not carry out the scanning even though the scanning instruction is sent. In addition, once a scanning is carried out, the scanning acceptance ID is cancelled, and therefore, it is impossible that displays HTML to acquire the scanning acceptance ID at the first time and after sends a scanning instruction without displaying HTML. In addition, as the effective period is set for the scanning acceptance ID, such an operation which acquires the scanning acceptance ID in advance with the HTML displayed and send the scanning instruction at an unintentional timing becomes impossible.

With such a structure, the scanning can be prevented from being carried out according to the scanning instruction at the unintentional timing or the scanning instruction from the unintentional device.

In the embodiment mentioned above, taking the scanner as one example is described, taking a scanning operation as one example is described, but the embodiment can be further applicable to a printing operation serving as the image forming operation which carries out image forming according to print data acquired from the external device.

As described in detail above, according to a technology described herein, the control can be carried out such that the operation is carried out without according to the instruction from an unintentional device.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
an interface configured to carry out data transmission/reception with an external device;
a storage section configured to store identification information which is an image forming acceptance identification; and
an operation section configured to accept input from a user; and
a display section configured to display an operation screen, wherein
a control section configured to generate the identification information when executing an ID issuing script incorporated in Markup Language data acquired from the external device, add the identification information to a hidden tag in the Markup Language data acquired from the external device;
the display section displays an operation screen according to a description of the acquired markup language data without displaying the identification information added to the hidden tag;
the control section further stores the identification information in the storage section and controls the interface so as to send the identification information registered in the hidden tag in the Markup Language data to the external device when the operation section detects that an execution button corresponding to an image forming operation is pressed through the operation section which is on the operation screen displayed by the display section;
the control section further performs to carry out an image forming operation when the identification information which is stored in the storage section exists in an image forming operation instruction received from the interface, and not to carry out the image forming operation when the identification information does not exist in the image forming operation instruction received from the interface.

2. The image forming apparatus according to claim 1, wherein the control section stores the identification information with current time information correspondingly in the storage section when storing the identification information in the storage section, and determines whether or not it is in an effective period based on a current time and time information stored in the storage section when the identification information which is stored in the storage section exists in the information received from the interface, and does not carry out the image forming operation when it is not in the effective period.

3. The image forming apparatus according to claim 1, wherein the control section cancels the identification information from the storage section when the identification information which is stored in the storage section exists in the information received from the interface.

4. The image forming apparatus according to claim 1, wherein the display section is configured to display the operation screen corresponding to markup language data which is stored in the external device and received from the external device.

5. The image forming apparatus according to claim 1, wherein the image forming operation is a scanning execution instruction;

the image forming apparatus comprises a reading section configured to scan an original sheet to make it electronic; and the control section sends image data, obtained in the case where the reading section carries out the scanning, to a same device from which the identification information is received from the interface.

6. An execution method of an image forming apparatus, comprising:

generating identification information, which is an image forming acceptance identification, when executing an ID issuing script based on instructions received within Markup Language data acquired from an external device, adding the identification information to a hidden tag in the markup language data acquired from an external device;

displaying an operation screen on a display section of the image forming apparatus according to a description of the acquired markup language data from the external device without displaying the identification information added to the hidden tag; and storing the identification information in a storage section and sending the identification information registered in the hidden tag in the Markup Language data to the external device when an execution button corresponding to an image forming operation is pressed is detected on the operation screen;

carrying out an image forming operation when the identification information which is stored in the storage section exists in an image forming operation instruction received, and not carrying out the image forming operation when the identification information does not exist in the image forming operation instruction received.

7. The execution method according to claim 6, comprising:

storing the identification information with current time information correspondingly in the storage section when the identification information is stored in the storage section, and determining whether or not it is in an effective period based on a current time and time information stored in the storage section when the identification information which is stored in the storage section exists in the received information, and not carrying out the image forming operation when it is not in the effective period.

8. The execution method according to claim 6, comprising: cancelling the identification information from the storage section when the identification information which is stored in the storage section exists in the received information.

* * * * *